United States Patent
Baker

(10) Patent No.: US 9,896,191 B2
(45) Date of Patent: Feb. 20, 2018

(54) FLUID-VECTORING SYSTEM

(71) Applicant: Rolls-Royce North American Technologies, Inc., Indianapolis, IN (US)

(72) Inventor: Von D. Baker, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 325 days.

(21) Appl. No.: 14/966,444

(22) Filed: Dec. 11, 2015

(65) Prior Publication Data

US 2016/0185449 A1    Jun. 30, 2016

Related U.S. Application Data

(60) Provisional application No. 62/098,388, filed on Dec. 31, 2014.

(51) Int. Cl.
 *B64C 3/38* (2006.01)
 *B64C 21/08* (2006.01)
 *B64C 15/14* (2006.01)

(52) U.S. Cl.
 CPC .............. *B64C 21/08* (2013.01); *B64C 15/14* (2013.01)

(58) Field of Classification Search
 CPC ....... B64C 21/02; B64C 21/08; B64C 21/025; B64C 21/04; B64C 21/06; B64C 15/14
 See application file for complete search history.

(56) References Cited

U.S. PATENT DOCUMENTS

| | | | | |
|---|---|---|---|---|
| 2,261,363 A | * | 11/1941 | Griswold | B64C 9/146 244/204 |
| 2,557,829 A | * | 6/1951 | Lavelle | B64C 21/02 244/204 |
| 2,987,277 A | * | 6/1961 | Richardson | B64C 9/32 244/204 |
| 5,335,489 A | | 8/1994 | Thayer | |
| 5,706,650 A | | 1/1998 | Thayer et al. | |
| 6,857,600 B1 | * | 2/2005 | Walker | F02K 1/12 239/265.35 |
| 7,096,662 B2 | | 8/2006 | Wehner | |
| 7,509,797 B2 | * | 3/2009 | Johnson | B64C 15/02 239/265.17 |
| 7,988,099 B2 | * | 8/2011 | Bray | B64C 5/08 244/199.1 |
| 8,020,367 B2 | | 9/2011 | Toffan et al. | |

(Continued)

FOREIGN PATENT DOCUMENTS

DE    102008024740 A1    11/2009
GB          340873 A    1/1931

OTHER PUBLICATIONS

Extended European Search Report, European Application No. 15195947.5, dated Oct. 5, 2016, 8 pages.

(Continued)

*Primary Examiner* — Richard G Davis

(74) *Attorney, Agent, or Firm* — Barnes & Thornburg LLP

(57) ABSTRACT

A jet aircraft includes an aircraft integrated, fluid vectoring, exhaust nozzle system. Implementation of this disclosure may eliminate or reduce the size of the aircraft vertical stabilizer and rudder assembly, thereby potentially improving aircraft survivability and increasing aircraft thrust-to-weight ratio.

18 Claims, 6 Drawing Sheets

(56) References Cited

U.S. PATENT DOCUMENTS

| | | | |
|---|---|---|---|
| 8,371,104 B2 | 2/2013 | Wells et al. | |
| 2004/0089764 A1* | 5/2004 | McClure | B64C 15/14 244/52 |
| 2010/0044501 A1* | 2/2010 | Silich | B64C 15/14 244/52 |
| 2011/0167788 A1* | 7/2011 | Warsop | B64C 15/02 60/204 |
| 2012/0256044 A1 | 10/2012 | Lerg | |

OTHER PUBLICATIONS

Flamm, Jeffrey D., Experimental Study of a Nozzle Using Fluidic Counterflow for Thrust Vectoring, Jul. 1998, pp. 1-28.

* cited by examiner

FLUID-VECTORING SYSTEM

CROSS REFERENCE TO RELATED APPLICATIONS

This application claims priority to and the benefit of U.S. Provisional Patent Application No. 62/098,388, filed 31 Dec. 2014, the disclosure of which is now expressly incorporated herein by reference.

FIELD OF THE DISCLOSURE

The present disclosure relates generally to flight vehicles, and more specifically to flight control systems for flight vehicles.

BACKGROUND

A vehicle, such as a jet aircraft, includes a body and a source of thrust such as a jet engine. In some operations, the vehicle may be configured so that the radar signature of the vehicle is minimized so that the vehicle has stealth capabilities.

Vehicles also include a body to which the jet engine is coupled. The body may use flaps located on horizontally extending tail surfaces to change altitude, e.g. pitch, during flight. The body may also include one or more vertical stabilizers to turn the aircraft left or right, e.g. yaw. The vertical stabilizers may create an increased radar cross-section signature.

SUMMARY

The present disclosure may comprise one or more of the following features and combinations thereof.

An aircraft, e.g., a fighter aircraft, may include a body and a fluid-vectoring system coupled to the body and configured to control movement of the body as the body moves along a flight path during flight of the aircraft. The fluid-vectoring system may include a first fluid passageway arranged to extend along an axis of the body and to define a first fluid cavity therein. The fluid-vectoring control unit may include a first fluid-control unit coupled to the body, e.g., the aft fuselage, to move between a retracted configuration in which a first flow of environmental fluid, e.g., airflow ingested from the fuselage external boundary layer airflow, that moves downstream along the axis from an environment surrounding the aircraft, through the first fluid cavity, and to the environment and an engaged configuration in which the first fluid-control unit blocks the first flow of environmental fluid from flowing through the first fluid cavity.

In some embodiments, the first fluid-control unit may include a first control door coupled to the body to move between an opened position in which the first flow of environmental fluid is communicated through the first fluid cavity and a closed position in which the first control door extends into the first fluid cavity to block communication of the first flow of environmental fluid through the first fluid cavity.

In some embodiments, the first fluid-control unit may include a second control door coupled to the body to move between an opened position in which the first flow of environmental fluid is communicated into the first fluid cavity and a closed position in which the second control door extends into the first fluid cavity to block communication of the first flow of environmental fluid into the first fluid cavity.

In some embodiments, the first fluid-control may include a third control door coupled to the body to move between an opened position in which the first flow of environmental fluid is communicated past the first control door and into the first fluid cavity and a closed position in which the third control door forms an additional cavity in the first fluid cavity when the first control door in the closed position.

In some embodiments, the first control door may be movable relative to and independent of the second control door or the third control door.

In some embodiments, the fluid-vectoring system may include a second fluid passageway arranged to extend along the axis of the body and to define a second fluid cavity therein. The fluid-vectoring system may include a second fluid-control unit coupled to the body to move between a retracted configuration in which a second flow of environmental fluid moves downstream along the axis from the environment surrounding the aircraft, through the second fluid cavity, and to the environment and an engaged configuration in which the second fluid-control unit blocks the second flow of environmental fluid from flowing through the second fluid cavity.

In some embodiments, the fluid-vectoring system may be arranged in a forward-flight arrangement when the first fluid-control unit and the second fluid-control unit are in the retracted configurations which causes the aircraft to move at a first velocity in a forward direction.

In some embodiments, the fluid-vectoring system may be arranged in an in-flight left-turn arrangement when the first fluid-control unit is in the retracted configuration and the second fluid-control unit is in the engaged configuration which causes the aircraft to turn away from the forward direction in a left-turn direction.

In some embodiments, the fluid-vectoring system may be arranged in a right-turn arrangement when the first fluid-control unit is in the engaged configuration and the second fluid-control unit is in the retracted configuration which causes the aircraft to turn away from the forward direction in a right-turn direction.

In some embodiments, the fluid-vectoring system may be arranged in an in-flight braking arrangement when the first fluid-control unit and the second fluid-control unit are in an in-flight braking configuration when the first and second flows of environmental fluid are blocked from flowing downstream through the first and second fluid cavities resulting in an internal drag force that causes the aircraft to decelerate to a relatively smaller second velocity.

In some embodiments, the first fluid-control unit may include a first control door coupled to the body to move between an opened position in which the first flow of environmental fluid is communicated through the first fluid cavity and a closed position in which the first control door extends into the first fluid cavity to block communication of the first flow of environmental fluid through the first fluid cavity. The first fluid-control unit may include a second control door coupled to the body to move between an opened position in which the first flow of environmental fluid is communicated into the first fluid cavity and a closed position in which the second control door extends into the first fluid cavity to block communication of the first flow of environmental fluid into the first fluid cavity. The first fluid-control unit may include a third control door coupled to the body to move between an opened position in which the first flow of environmental fluid is communicated past the first control door and into the first fluid cavity and a closed position in which the third control door forms an additional cavity in the first fluid cavity when the first control door is in the closed position.

In some embodiments, the second fluid-control unit may include a first control door coupled to the body to move between an opened position in which the second flow of environmental fluid is communicated through the second fluid cavity and a closed position in which the first control door of the second fluid-control unit extends into the second fluid cavity to block communication of the second flow of environmental fluid through the second fluid cavity. The second fluid-control unit may include a second control door coupled to the body to move between an opened position in which the second flow of environmental fluid is communicated into the second fluid cavity and a closed position in which the second control door of the second fluid-control unit extends into the second fluid cavity to block communication of the second flow of environmental fluid into the second fluid cavity. The second fluid-control unit may include a third control door coupled to the body to move between an opened position in which the second flow of environmental fluid is communicated past the first control door of the second fluid-control unit and into the second fluid cavity and a closed position in which the third control door of the second fluid-control unit forms an additional cavity in the second fluid cavity when the first control door of the second fluid-control unit is in the closed position.

In some embodiments, the aircraft may include the fluid-vectoring system in a forward-flight arrangement when all of the control doors are in the opened position.

In some embodiments, the aircraft may include the fluid-vectoring system in an in-flight left-turn arrangement when all of the control doors of the first fluid-control unit are in the opened position and all of the control doors of the second fluid-control unit are in the closed position.

In some embodiments, the aircraft may include the fluid-vectoring system in a right-turn arrangement when all control doors of the first fluid-control unit are in the closed position and all the control doors of the second fluid-control unit are in the opened position.

In some embodiments, the aircraft may include the fluid-vectoring system in an in-flight braking arrangement when the first control doors of both the first and second fluid-control units are in the closed position and the second and third control doors of both the first and second fluid-control units are in the opened position.

According to another aspect of the present disclosure, an aircraft may include a body and a fluid-vectoring system coupled to the body and configured to control movement of the body as the body moves along a flight path during flight of the aircraft. The fluid-vectoring system may include a first fluid passageway arranged to extend along an axis of the body and to define a first fluid cavity therein. The fluid-vectoring control unit may include a first fluid-control unit coupled to the body to move between a retracted configuration in which a first flow of environmental fluid moves downstream along the axis from an environment surrounding the aircraft, through the first fluid cavity, and to the environment and an engaged configuration in which the first fluid-control unit blocks the first flow of environmental fluid from flowing through the first fluid cavity. The body may include a first bypass passageway defining a first bypass cavity, the first bypass passageway is arranged to communicate a first bypass flow of environmental fluid in the downstream direction from the environment surrounding the aircraft through the first bypass cavity into the first fluid passageway.

In some embodiments, the fluid-vectoring system may include a second fluid passageway arranged to extend along the axis of the body and to define a second fluid cavity therein. The fluid-vectoring system may include a second fluid-control unit coupled to the body to move between a retracted configuration in which a second flow of environmental fluid moves downstream along the axis from the environment surrounding the aircraft, through the second fluid cavity, and to the environment and an engaged configuration in which the second fluid-control unit blocks the second flow of environmental fluid from flowing through the second fluid cavity.

In some embodiments, the first bypass passageway may be arranged to communicate a first bypass flow of environmental fluid in the downstream direction from the environment surrounding the aircraft through the first bypass cavity into the first fluid passageway and the second fluid passageway.

In some embodiments the body may include a second bypass passageway defining a second bypass cavity and the second bypass passageway is arranged to communicate a second bypass flow of environmental fluid in the downstream direction from the environment surrounding the aircraft through the second bypass cavity into the second fluid passageway.

In some embodiments, the aircraft may include the fluid-vectoring system arranged in a forward-flight arrangement when the first and second fluid-control units are in the retracted configuration to cause the aircraft to move at a first velocity in the forward direction.

In some embodiments, the aircraft may include the fluid-vectoring system arranged in an in-flight left-turn arrangement when the first fluid-control unit is in the retracted configuration and the second fluid-control unit is in the engaged configuration which causes the aircraft to turn away from the forward direction in a left-turn direction.

In some embodiments, the aircraft may include the fluid-vectoring system arranged in a right-turn arrangement when the first fluid-control unit is in the engaged configuration and the second fluid-control unit is in the retracted configuration which causes the aircraft to turn away from the forward direction in a right-turn direction.

In some embodiments, the aircraft may include the fluid-vectoring system arranged in an in-flight braking arrangement when the first fluid-control unit is in the in-flight braking configuration which causes the first bypass flow to be communicated downstream from environment into the first bypass cavity and upstream through a portion of the first fluid cavity and the second fluid-control unit is in the in-flight braking configuration which causes the second bypass flow to be communicated downstream from environment into the second bypass cavity and upstream through a portion of the second fluid cavity to cause the aircraft to decelerate to a relatively smaller second velocity.

In some embodiments, the first fluid-control unit may include a first control door coupled to the body to move between an opened position in which the first flow environmental fluid and the first bypass flow of environmental fluid are communicated through the first fluid cavity and a closed position in which the first control door extends into the first fluid cavity to block communication of the first flow and first bypass flow of environmental fluid through the first fluid cavity.

In some embodiments, the first fluid-control unit may include a second control door coupled to the body to move between an opened position in which the first flow of environmental fluid is communicated into the first fluid cavity and a closed position in which the second control door extends into the first fluid cavity to block communication of the first flow of environmental fluid into the first fluid cavity.

In some embodiments, the first fluid-control unit may include a third control door coupled to the body to move between an opened position in which the first flow of environmental fluid is communicated past the first control door may and into the first fluid cavity and a closed position in which the third control door forms an additional cavity in the first fluid cavity when the first control door in the closed position.

In some embodiments, the first control door may be movable relative to and independent of the second control door or the third control door.

In some embodiments, the aircraft may include the fluid-vectoring system arranged in an in-flight left-turn arrangement when all three doors of the first fluid-control unit are in the opened position and all three doors of the second fluid-control unit are in the closed position which causes the aircraft to turn away from the forward direction in a left-turn direction.

In some embodiments, the aircraft may include the fluid-vectoring system arranged in a right-turn arrangement when all three doors of the first fluid-control unit are in the closed position and all three doors of the second fluid-control unit are in the opened position which causes the aircraft to turn away from the forward direction in a right-turn direction.

In some embodiments, the aircraft may include the fluid-vectoring system arranged in an in-flight braking arrangement when the first door of the first fluid-control unit is in the closed position, the second and third doors of the first fluid-control unit are in the opened position, the first door of the second fluid-control unit is in the closed position, and the second and third doors of the second fluid-control unit are in the opened position.

In some embodiments, the aircraft may include the fluid-vectoring system arranged in an in-flight braking arrangement, which causes the aircraft to decelerate to a relatively smaller second velocity.

In some embodiments, the first bypass flow may be blocked from flowing past the first control door and permitted to flow past the second and third control doors when the fluid-vectoring system is in the in-flight braking arrangement.

In some embodiments, the body may lack a vertical stabilizer.

According to another aspect of the present disclosure, a fluid-vectoring system for a craft may include a first fluid passageway arranged to extend along an axis of the craft and to define a first fluid cavity therein. The fluid-vectoring system may include a first fluid-control unit coupled to a body of the craft to move between a retracted configuration in which a first flow of environmental fluid moves downstream along the axis from an environment surrounding the craft, through the first fluid cavity, and to the environment and an engaged configuration in which the first fluid-control unit blocks the first flow of environmental fluid from flowing through the first fluid cavity.

In some embodiments, the fluid-vectoring system may include a second fluid passageway arranged to extend along the same axis of the craft as the first fluid passageway and to define a second fluid cavity therein. The fluid-vectoring system may include a second fluid-control unit coupled to the body of the craft to move between a retracted configuration in which a second flow of environmental fluid moves downstream along the axis from the environment surrounding the craft, through the second fluid cavity, and to the environment and an engaged configuration in which the second fluid-control unit blocks the second flow of environmental fluid from flowing through the second fluid cavity. In some embodiments, the first fluid control unit may include a first control door coupled to the body of the craft to move between an opened position in which the first flow of environmental fluid is communicated through the first fluid cavity and a closed position in which the first control door extends into the first fluid cavity to block communication of the first flow of environmental fluid through the first fluid cavity. The first fluid control unit may include a second control door coupled to the body of the craft to move between an opened position in which the first flow of environmental fluid is communicated into the first fluid cavity and a closed position in which the second control door extends into the first fluid cavity to block communication of the first flow of environmental fluid into the first fluid cavity.

In some embodiments, the first fluid-control unit may include a third control door coupled to the body of the craft to move between an opened position in which the first flow of environmental fluid is communicated past the first control door and into the first fluid cavity and a closed position in which the third control door forms an additional cavity in the first fluid cavity when the second control door is in the closed position.

In some embodiments, the fluid-vectoring system may include a first bypass passageway defining a first bypass cavity. The first bypass passageway is arranged to communicate a first bypass flow of environmental fluid in the downstream direction from the environment surrounding the craft through the first bypass cavity into the first fluid passageway.

In some embodiments the fluid-vectoring system may include a second bypass passageway defining a second bypass cavity. The second bypass passageway is arranged to communicate a second bypass flow of environmental fluid in the downstream direction from the environment surrounding the craft through the second bypass cavity into the second fluid passageway.

In some embodiments, the fluid-vectoring system may be arranged in a forward-traveling arrangement when all three doors of the first fluid-control unit are in the opened position and when all three doors of the second fluid-control unit are in the opened position which causes the craft to move at a first velocity in the forward direction.

In some embodiments the fluid-vectoring system may be arranged in an in-flight left-turn arrangement when all three doors of the first fluid-control unit are in the opened position and all three doors of the second fluid-control unit are in the closed position which causes the craft to turn away from the forward direction in a left-turn direction.

In some embodiments, the fluid-vectoring system may be arranged in a right-turn arrangement when all three doors of the first fluid-control unit are in the closed position and all three doors of the second fluid-control unit are in the opened position which causes the craft to turn away from the forward direction in a right-turn direction.

In some embodiments, the fluid-vectoring system may be arranged in an in-flight braking arrangement when the first door of the first fluid-control unit is in the closed position, the second and third doors of the first fluid-control unit are in the opened position, the first door of the second fluid-control unit is in the closed position, and the second and third doors of the second fluid-control unit are in the opened position.

In some embodiments, the craft may include the fluid-vectoring system wherein when the fluid-vectoring system is arranged in an in-flight braking arrangement, the craft decelerates to a relatively smaller second velocity.

In some embodiments, the fluid-vectoring system may be arranged in an in-flight braking arrangement when the first fluid-control unit is in the in-flight braking configuration which causes the first bypass flow to be communicated downstream from environment into the first bypass cavity and upstream through a portion of the first fluid cavity and the second fluid-control unit is in the in-flight braking configuration which causes the second bypass flow to be communicated downstream from environment into the second bypass cavity and upstream through a portion of the second fluid cavity to cause the aircraft to decelerate to a relatively smaller second velocity.

According to another aspect of the present disclosure, a method of controlling direction movement of an aircraft may include the steps of providing a craft including a fluid-vectoring system comprising a first fluid passageway controlled by a first fluid-control unit and a second fluid passageway controlled by a second fluid-control unit and lacking a vertical stabilizer, arranging the fluid-vectoring system in a forward-flight arrangement to cause a flow of environmental fluid to communicate through the first fluid passageway and a flow of environmental fluid to communicate through the second fluid passageway, arranging the fluid-vectoring system in an in-flight left-turn arrangement to cause a left yaw turn by allowing a flow of environmental fluid to communicate through the first fluid passageway and by blocking a flow of environmental fluid from communicating through the second fluid passageway, arranging the fluid-vectoring system in a right-turn arrangement to cause a right yaw turn by blocking a flow of environmental fluid from communicating through the first fluid passageway and by allowing a flow of environmental fluid to communicate through the second fluid passageway, and arranging the fluid-vectoring system in an in-flight braking arrangement by preventing a flow of environmental fluid through the first fluid passage way and by preventing a flow of environmental fluid through the second fluid passage way.

These and other features of the present disclosure will become more apparent from the following description of the illustrative embodiments.

BRIEF DESCRIPTION OF THE DRAWINGS

FIG. 5 is a view similar to FIG. 2 showing the fluid-vectoring system in a forward-flight arrangement in which first and second flows of environmental fluid are admitted through associated first and second fluid passageways to cause the jet aircraft to move in a forward direction at a first velocity;

FIG. 6 is a view similar to FIG. 5 with the fluid-vectoring system moved to the in-flight left-turn arrangement in which the first flow of fluid is admitted through the associated first fluid passageway while the second flow of fluid is blocked form moving through the associated second fluid passageway to cause the jet aircraft to move in a counterclockwise direction toward the left away from the forward direction.

FIG. 7 is a view similar to FIG. 6 with the fluid-vectoring system moved to an air-braking right-turn arrangement in which a first flow of fluid is blocked from moving through the associated first fluid passageway while the second flow of fluid is admitted through the associated second fluid passageway to cause the jet aircraft to move in a clockwise direction toward the right away from the forward direction; and FIG. 8 is a view similar to FIG. 7 with the fluid-vectoring system moved to an in-flight braking arrangement in which first and second flows of environmental fluid are blocked from flowing through associated first and second fluid passageways to cause the jet aircraft to move in a forward direction at a relatively slower second velocity.

DETAILED DESCRIPTION OF THE DRAWINGS

Figure 1:
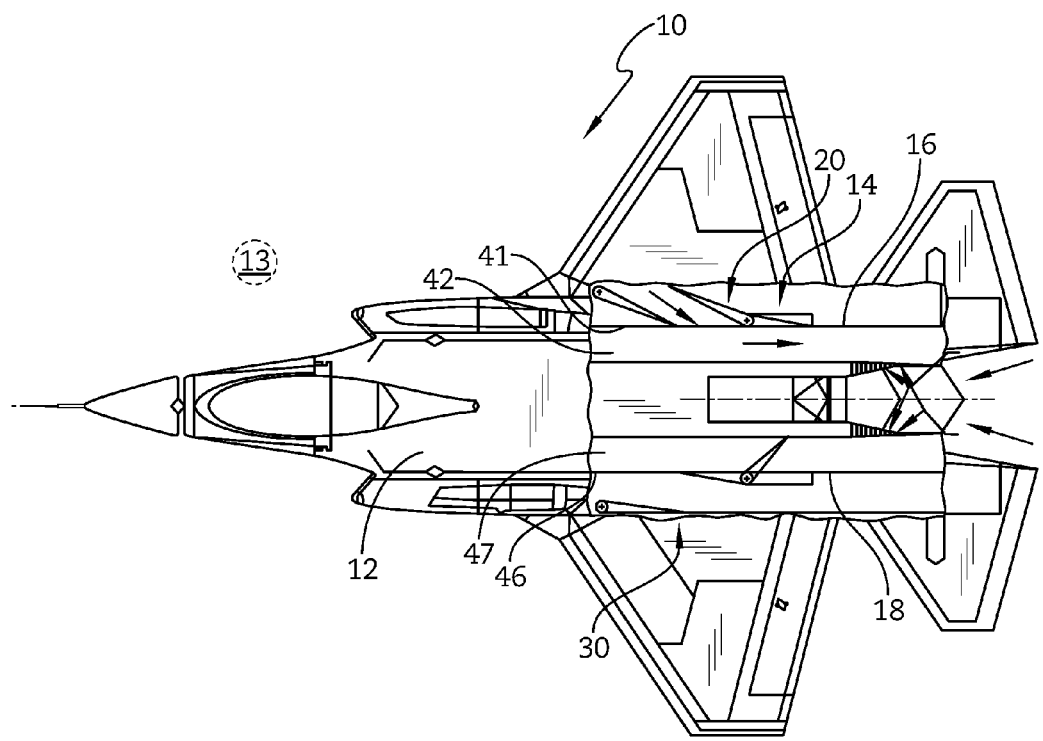
FIG. 1 is a plan view of a jet aircraft in accordance with the present disclosure with portions broken away to reveal that the jet aircraft includes an integrated fluid-vectoring system configured to control movement of the jet aircraft during flight and suggesting that the fluid-vectoring system includes first and second airframe integrated induced base-drag cavities, hereinafter referred to as fluid passageways, formed in a body of the jet aircraft that admit selectively environmental fluid, e.g., external air flow, through the body during flight to cause the jet aircraft to move at a first velocity as suggested in FIG. 5, to the left as shown in FIG. 1 and suggested in FIG. 6, to the right as suggested in FIG. 7, and to a slower second velocity as suggested in FIG. 8, note that in the configuration shown in FIGS. 6 and 7, the passageway that is blocked and not vented to ambient pressures, creates an induced base drag caused by a reduction in below-ambient pressure that, in turn, creates a yaw-vectoring moment that yaws the aircraft left or right.
Figure 2:
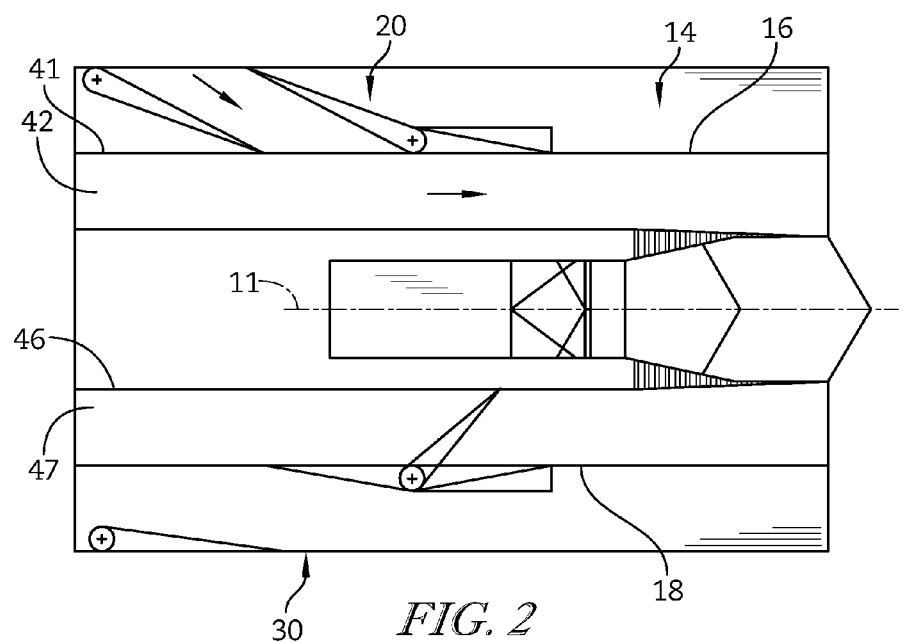
FIG. 2 is an enlarged partial plan view of the fluid-vectoring system of FIG. 1 showing that fluid-vectoring system includes a first fluid passageway arranged to extend along a longitudinal axis of the jet aircraft, a second fluid passageway spaced apart from the first fluid passageway to locate a turbine engine therebetween, a first fluid control unit arranged in a retracted configuration which allows a first flow of environmental fluid to be admitted through the first fluid passageway, and a second fluid control unit arranged in an engaged configuration which blocks a second fluid flow from moving through the second fluid passageway.
Figure 3:
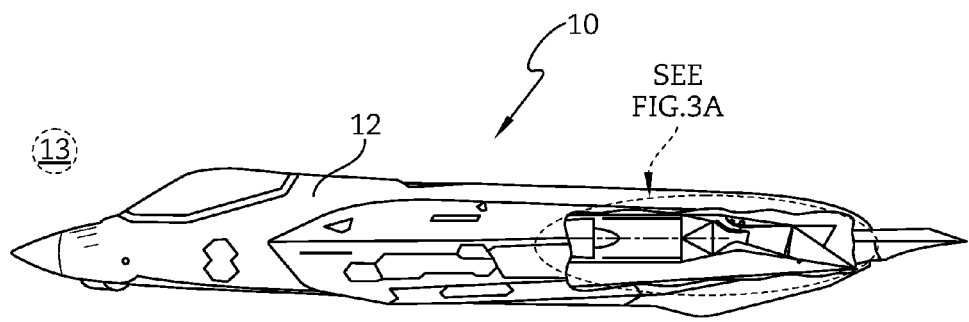
FIG. 3 is a side elevation view of the jet aircraft of FIG. 1 showing that the jet aircraft lacks a vertical stabilizer and having portions broken away to reveal a portion of the jet engine, an exhaust transition duct formed in the body of the jet aircraft, and a portion of the fluid-vectoring system.
Figure 3A:
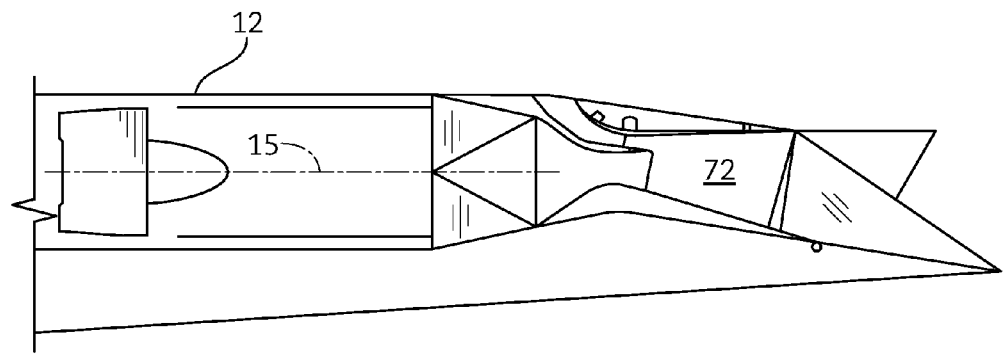
FIG. 3A is an enlarged view of the circled region of FIG. 3.

For the purposes of promoting an understanding of the principles of the disclosure, reference will now be made to a number of illustrative embodiments illustrated in the drawings and specific language will be used to describe the same.

A jet aircraft 10 in accordance with the present disclosure includes a body 12 and a fluid-vectoring system 14 as shown in FIGS. 1, 2, and 5-8. The fluid-vectoring system 14 is configured to control movement of the jet aircraft 10 as the jet aircraft 10 moves along a flight path. The fluid-vectoring system 14 may be arranged in one of a forward-flight arrangement as suggested in FIG. 5, an in-flight left-turn arrangement as suggested in FIG. 6, an in-flight right-turn arrangement as suggested in FIG. 7, and an in-flight braking arrangement as suggested in FIG. 8.

The fluid-vectoring system 14 includes a first fluid passageway 16, a first fluid control unit 20 associated with the first fluid passageway, a second fluid passageway 18, and a second fluid control unit 30 associated with the second fluid passageway 18 as shown in FIGS. 5-8. Together, the first and second fluid control units 20 are used to establish the forward-flight arrangement, in-flight left-turn arrangement, air-braking right-turn arrangement, and in-flight braking arrangement of the fluid-vectoring system 14 as shown in FIGS. 5-8.

Figure 5:
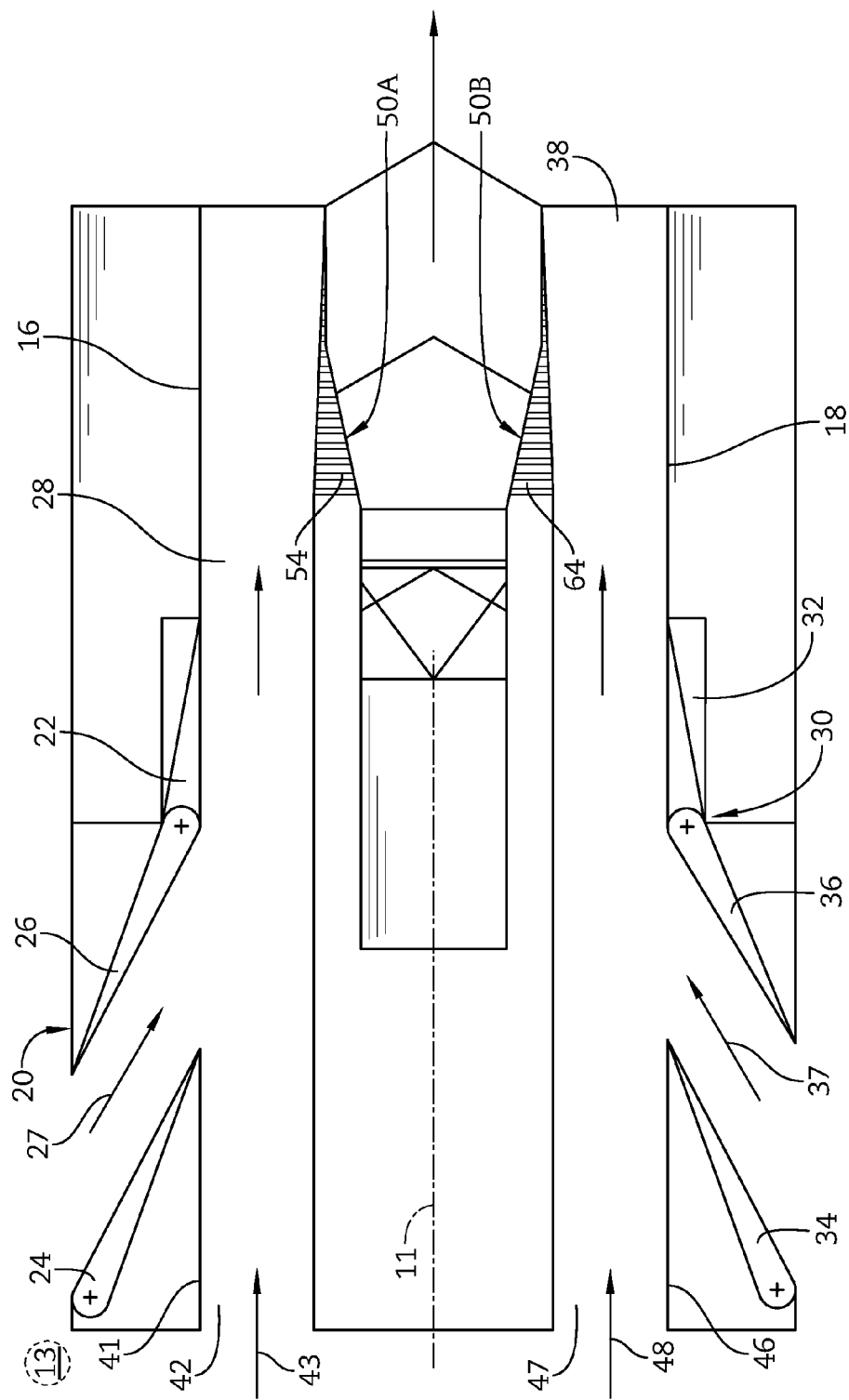
FIGS. 5-8 are a series of views similar to FIG. 2 showing the fluid-vectoring system in various operational arrangements.

The first fluid control unit 20 and the second fluid control unit 30 are both arranged in a retracted configuration to establish the forward-flight arrangement of the fluid-vectoring system 14 as shown in FIG. 5. When the first fluid control unit 20 is in a retracted configuration, a first flow 27 of environmental fluid moves downstream along the axis 11 from an environment 13 surrounding the aircraft, through a first fluid cavity 28 formed in the first fluid passageway 16, and to the environment 13. When the second fluid control unit 30 is in a retracted configuration, a second flow 37 of environmental fluid moves downstream along the axis 11 from an environment 13 surrounding the aircraft, through a second fluid cavity 38 formed in the second fluid passageway 18, and to the environment 13. The forward flight-arrangement causes the jet aircraft 10 to travel at a first velocity in a relatively straight, forward direction.

Figure 6:
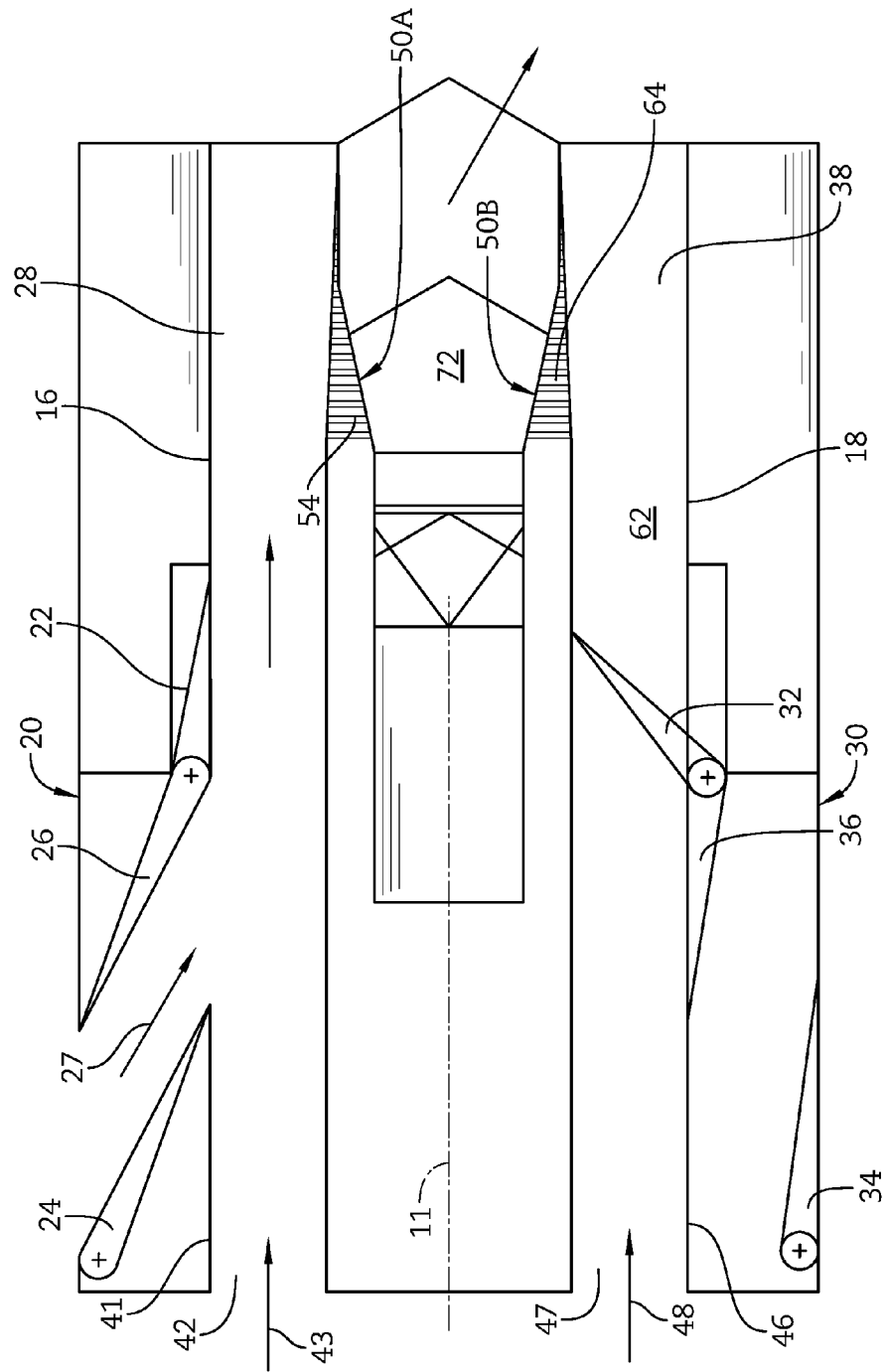

The first fluid control unit 20 is in a retracted configuration and the second fluid control unit 30 is in an engaged configuration to establish the in-flight left-turn arrangement of the fluid-vectoring system 14 as shown in FIG. 6. When the first fluid control unit 20 is in a retracted configuration, the first flow 27 of environmental fluid moves downstream along the axis 11 from an environment 13 surrounding the aircraft, through the first fluid cavity 28 formed in the first fluid passageway 16, and to the environment 13. When the second fluid control unit 30 is in an engaged configuration, the second fluid control unit 30 blocks the second flow 37 of environmental fluid from flowing into or through the second fluid passageway 18. The in-flight left-turn arrangement causes the jet aircraft 10 to turn away from a forward direction in a left-turn direction.

Figure 7:
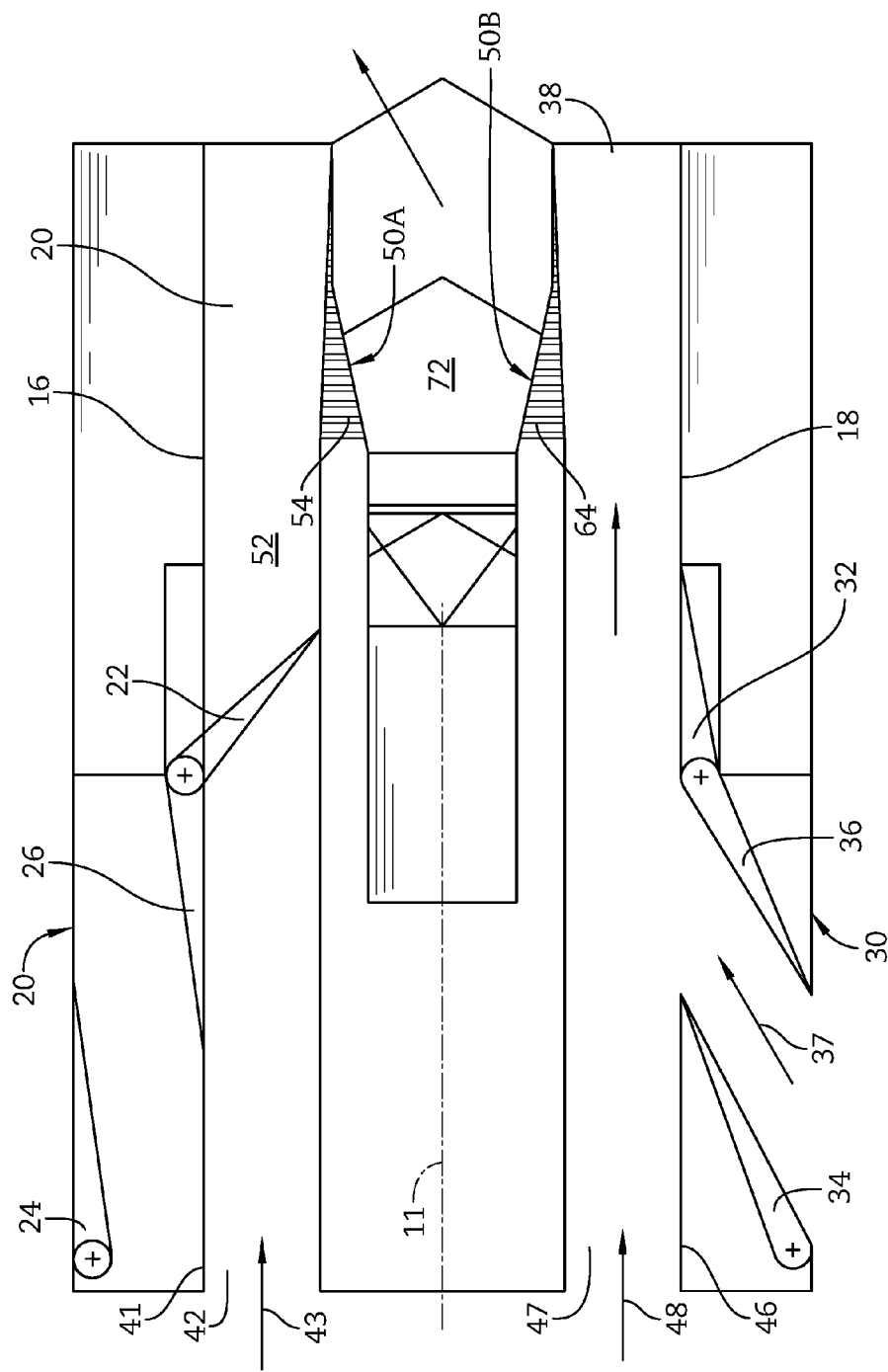

The first fluid control unit 20 is arranged in an engaged configuration and the second fluid control unit 30 in a retracted configuration to establish the air-braking right-turn arrangement of the fluid-vectoring system 14 as shown in FIG. 7. When the first fluid control unit 20 is in an engaged configuration, the first fluid control unit 20 blocks the first flow 27 of environmental fluid from flowing into or through the first fluid passageway 16. When the second fluid control unit 30 is in a retracted configuration, the second flow 37 of environmental fluid moves downstream along the axis 11 from an environment 13 surrounding the aircraft, through the second fluid cavity 38 formed in the second fluid passageway 18, and to the environment 13. The air-braking right-turn flight-arrangement causes the jet aircraft 10 to turn away from a forward direction in a right-turn direction.

Figure 8:
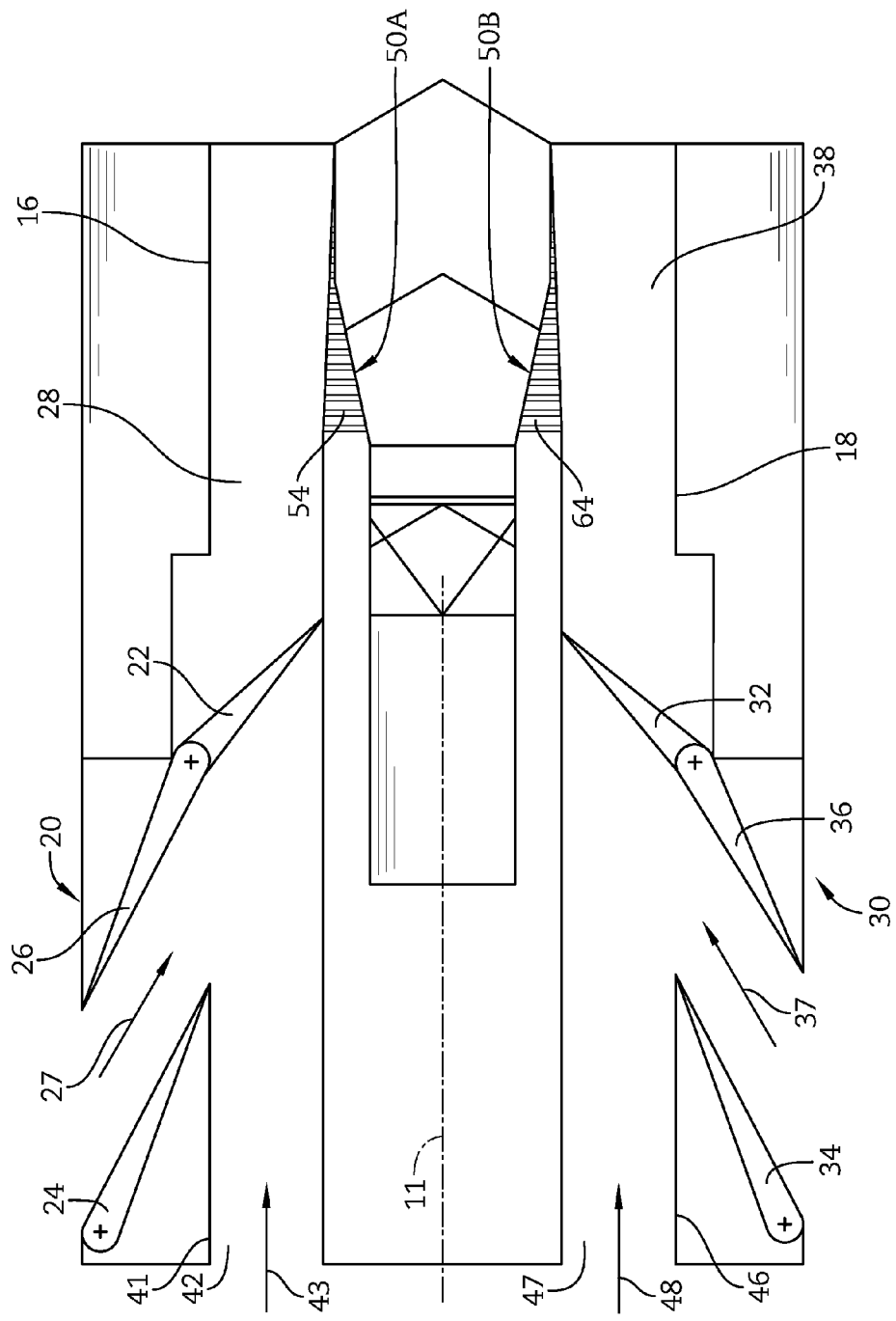

The first fluid control unit 20 and the second fluid control unit 30 are both arranged in an in-flight braking configuration to establish the in-flight braking arrangement of the fluid-vectoring system 14 as shown in FIG. 8. When the first fluid control unit 20 is in an in-flight braking configuration, the first flow 27 of environmental fluid is ingested in the first fluid cavity 28 formed in the first fluid passageway 16 and the first flow 27 of environmental fluid is blocked from moving downstream along the axis 11 through the first fluid passageway 16. When the second fluid control unit 30 is in an in-flight braking configuration, the second flow 37 of environmental fluid is ingested in the second fluid cavity 38 formed in the second fluid passageway 18 and the second flow 37 of environmental fluid is blocked from moving downstream along the axis 11 through the second fluid passageway 18. The in-flight braking arrangement causes the jet aircraft 10 to decelerate to a relatively smaller second velocity.

The fluid-vectoring system 14 controls movement of a craft by changing the positions of a series of doors. In an illustrative embodiment, as shown in FIGS. 5-8, the first fluid control unit 20 includes a first control door 22, a second control door 24, and a third control door 26. The first control door 22 is aft in the first fluid control unit 20 and is coupled to the body 12 to move between an opened position shown in FIG. 5 and a closed position shown in FIG. 7. The second control door 24 is in the fore of the first fluid control unit 20 and is coupled to the body 12 to move between an opened position shown in FIG. 5 and a closed position shown in FIG. 7. The third control door 26 is in between the first control door 22 and the second control door 24 and is coupled to the body 12 to move between an opened position shown in FIG. 5 and a closed position shown in FIG. 7.

When the first fluid control unit 20 is in a retracted configuration, as shown in FIGS. 5 and 6, the first control door 22, the second control door 24, and the third control door 26 are all in an opened position. When the first fluid control unit 20 is in an engaged configuration, as shown in FIG. 7, the first control door 22, the second control door 24, and the third control door 26 are all in a closed position. When the first fluid control unit 20 is in an in-flight braking configuration, as shown in FIG. 8, the first control door 22 is in a closed position, the second control door 24 is in an opened position, and the third control door 26 is in an opened position.

As shown in FIGS. 5-8, the second fluid control unit 30 includes a first control door 32, a second control door 34, and a third control door 36. The first control door 32 is aft in the second fluid control unit 30 and is coupled to the body 12 to move between an opened position shown in FIG. 5 and a closed position shown in FIG. 6. The second control door 34 is in the fore of the second fluid control unit 30 and is coupled to the body 12 to move between an opened position shown in FIG. 5 and a closed position shown in FIG. 6. The third control door 36 is in between the first control door 32 and the second control door 34 and is coupled to the body 12 to move between an opened position shown in FIG. 5 and a closed position shown in FIG. 6.

When the second fluid control unit 30 is in a retracted configuration, as shown in FIGS. 5 and 7, the first control door 32, the second control door 34, and the third control door 36 are all in an opened position. When the second fluid control unit 30 is in an engaged configuration, as shown in FIG. 6, the first control door 32, the second control door 34, and the third control door 36 are all in a closed position. When the first fluid control unit 20 is in an in-flight braking configuration, as shown in FIG. 8, the first control door 32 is in a closed position, the second control door 34 is in an opened position, and the third control door 36 is in an opened position.

The fluid-vectoring system 14 controls movement of a craft by changing the positions of a series of doors. In an illustrative embodiment, as suggested by FIG. 5-8, the first fluid control unit 20 includes three control doors. The first control door 22 is in the aft of the first fluid control unit 20 and is coupled to the body to move between an opened position in which the first flow 27 of environmental fluid is communicated through the first fluid passageway 16 and a closed position in which the first control door 22 extends into the first fluid passageway 16 to block communication of the first flow 27 of environmental fluid through the first fluid cavity. The second control door 24 is in the fore of the first fluid control unit 20 and is coupled to the body to move between an opened position in which the first flow 27 of environmental fluid is communicated into the first fluid passageway 16 and a closed position in which the second control door 24 extends into the first fluid passageway 16 to block communication of the first flow 27 of environmental fluid into the first fluid passageway 16. The third control door 26 is in between the first control door 22 and the second control door 24 and is coupled to the body to move between an opened position in which the first flow 27 of environmental fluid is communicated past the first control door 22 and into the first fluid passageway 16 and a closed position in which the third control door 26 forms an additional cavity in the first fluid passageway 16 when the first control door 22 is in the closed position. The second fluid control unit 30 includes the first control door 32, the second control door 34, and the third control door 36. Each of the control doors 32, 34, and 36 are coupled to the body 12 to move between an opened position and a closed position with a corresponding effect on the second flow 37 of the environmental fluid.

When the fluid-vectoring system 14 is in a forward-flight arrangement as shown in FIG. 5, all six control doors 22, 24, 26, 32, 34, and 36 are in an opened position. When the fluid-vectoring system 14 is in an in-flight left-turn arrangement as shown in FIG. 6, all three control doors 22, 24, & 26 of the first fluid control unit 20 are in an opened position and all three control doors 32, 34, & 36 of the second fluid control unit 30 are in a closed position. When the fluid-vectoring system 14 is in an in-flight right-turn arrangement as suggested in FIG. 7, all three control doors 22, 24, & 26 of the first fluid control unit 20 are in a closed position and all three control doors 32, 34, & 36 of the second fluid control unit 30 are in an opened position. When the fluid-vectoring system 14 is in an in-flight braking arrangement as suggested in FIG. 8, the first control door 22 of the first fluid control unit 20 and the first control door 32 of the second fluid control unit 30 are in a closed position and the second 24 and third 26 control doors of the first fluid control unit 20 and the second 34 and third 36 control doors of the second fluid control unit 30 are in an opened position.

The jet aircraft 10 in accordance with the present disclosure includes the body 12 and the fluid-vectoring system 14 as shown in FIGS. 5-8. The fluid-vectoring system 14 includes the first fluid passageway 16. The body 12 includes a first bypass passageway 41 defining a first bypass cavity 42. The first bypass passageway 41 is arranged to communicate a first bypass flow 43 of environmental fluid in the downstream direction from an environment 13 surrounding the aircraft through the first bypass cavity 42 into the first fluid passageway 16. Fluid from the environment 13 is ingested by the jet aircraft 10 through the first bypass passageway 41 where it is communicated into the first fluid cavity 28.

The first fluid control unit 20 is associated with the first fluid passageway 16. When the first fluid control unit 20 is in a retracted configuration as shown in FIGS. 5 and 6, the first bypass flow 43 of environmental fluid moves downstream along the axis 11 through the first bypass passage 41 from the environment 13 surrounding the aircraft and through the first fluid cavity 28 formed in the first fluid passageway 16, and to the environment 13. At the same time, first flow 27 of environmental fluid moves downstream along the axis 11 from the environment 13 surrounding the aircraft, through the first fluid cavity 28 formed in the first fluid passageway 16, and to the environment 13.

When the first fluid control unit 20 is in an engaged configuration as shown in FIG. 7, the first bypass flow 43 of environmental fluid is ingested through the first bypass cavity 42 formed in the first bypass passageway 41 and into the first fluid cavity 28. At the same time, the first bypass flow 43 of environmental fluid is blocked from moving downstream along the axis 11 through the first fluid passageway 16 and the first fluid control unit 20 blocks the first flow 27 of environmental fluid from flowing into the first fluid cavity.

When the first fluid control unit 20 is in an in-flight braking configuration as shown in FIG. 8, the first bypass flow 43 of environmental fluid is ingested through the first bypass cavity 42 formed in the first bypass passageway 41 and into the first fluid cavity 28 formed in the first fluid passageway 16. At the same time, the first flow 27 of environmental fluid is ingested in the first fluid cavity 28 formed in the first fluid passageway 16 and both the first bypass flow 43 of environmental fluid and the first flow 27 of environmental fluid are blocked from moving downstream along the axis 11 through the first fluid passageway 16.

The body 12 further includes a second bypass passageway 46 defining a second bypass cavity 47. The second bypass passageway 46 is arranged to communicate a second bypass flow 48 of environmental fluid in the downstream direction from the environment 13 surrounding the aircraft through the second bypass cavity 47 into the second fluid passageway 18. In accordance with the present disclosure, fluid from the environment 13 is ingested by the jet aircraft 10 into the second bypass passageway 46 where it is communicated into the second bypass cavity 47.

Second fluid control unit 30 is associated with the second fluid passageway 18. When the second fluid control unit 30 is in the retracted configuration as shown in FIGS. 5 and 7, the second bypass flow 48 of environmental fluid moves downstream along the axis 11 through the second bypass passageway 46 from the environment 13 surrounding the aircraft and through the second fluid cavity 38 formed in the second fluid passageway 18, and to the environment 13. The second flow 37 of environmental fluid also moves downstream along the axis 11 from an environment 13 surrounding the aircraft, through the second fluid cavity 38 formed in the second fluid passageway 18, and to the environment 13.

When the second fluid control unit 30 is in the engaged configuration as shown in FIG. 6, the second bypass flow 48 of environmental fluid is ingested through the second bypass cavity 47 formed in the second bypass passageway 46 and into the second fluid cavity 38. At the same time, the second bypass flow 48 of environmental fluid is blocked from moving downstream along the axis 11 through the second fluid passageway 18 and the second fluid control unit 30 blocks the second flow 37 of environmental fluid from flowing into the second fluid cavity. When the second fluid control unit 30 is in an in-flight braking configuration as shown in FIG. 8, the second bypass flow 48 of environment 13 is ingested through the second bypass cavity 47 formed in the first bypass passageway 41 and into the second fluid cavity 38 formed in the second fluid passageway 18 and the second flow 37 of environmental fluid is ingested in the second fluid cavity 38 formed in the second fluid passageway 18 and both the second bypass flow 48 of environmental fluid and the second flow 37 of environmental fluid are blocked from moving downstream along the axis 11 through the second fluid passageway 18.

The first bypass passageway 41 is arranged to communicate the first bypass flow 43 of environmental fluid in the downstream direction from the environment 13 surrounding the aircraft through the first bypass cavity 42 into the first fluid passageway 16. The second bypass passageway 46 is arranged similarly relative to the second bypass cavity 47 and second fluid passageway 18. Together, the first and second fluid control units 20 are used to establish the forward-flight arrangement, in-flight left-turn arrangement, in-flight right-turn arrangement, and in-flight air-braking arrangement of the fluid-vectoring system 14 as shown in FIGS. 5-8. The first bypass passageway and the second bypass passageway increase the yaw effect of the in-flight left-turn arrangement and the in-flight right-turn arrangement of the fluid-vectoring system 14 and increase the braking effect of the in-flight braking arrangement.

The first fluid control unit 20 and the second fluid control unit 30 are both arranged in a retracted configuration to establish the forward-flight arrangement of the fluid-vectoring system 14 with bypass flows as shown in FIG. 5. When the fluid-vectoring system 14 with bypass flows is in a forward-flight arrangement, the first bypass flow 43 of environmental fluid moves downstream along the axis 11 through the first bypass passageway 41 from the environment 13 surrounding the aircraft and through the first fluid cavity 28 formed in the first fluid passageway 16. When the fluid-vectoring system 14 with bypass flows is in a forward-flight arrangement, the second bypass flow 48 of environmental fluid moves downstream along the axis 11 through the second bypass passageway 46 from the environment 13 surrounding the aircraft and through a second fluid cavity 38 formed in the second fluid passageway 18. The forward flight-arrangement causes the jet aircraft 10 to travel at a first velocity in a relatively straight, forward direction.

The in-flight left-turn arrangement of the fluid-vectoring system 14 with bypass flows is established when the first fluid control unit 20 is in a retracted configuration and the second fluid control unit 30 is in an engaged as shown in FIG. 6. When the fluid-vectoring system 14 with bypass flows is in an in-flight left-turn arrangement, the first bypass flow 43 of environmental fluid moves downstream along the axis 11 through the first bypass passageway 41 from the environment 13 surrounding the aircraft and through the first fluid cavity 28 formed in the first fluid passageway 16. When the fluid-vectoring system 14 with bypass flows is in an in-flight left-turn arrangement, the second bypass flow 48 of environmental fluid is ingested through the second bypass cavity 47 formed in the second bypass passageway 46 and into the second fluid cavity 38. The second bypass flow 48 of environmental fluid is blocked from moving downstream along the axis 11 through the second fluid passageway 18. The in-flight left-turn arrangement causes the jet aircraft 10 to turn away from a forward direction in a left-turn direction.

The first fluid control unit 20 is in an engaged configuration and the second fluid control unit 30 is in a retracted configuration to establish the air-braking right-turn arrangement of the fluid-vectoring system 14 with bypass flows as shown in FIG. 7. When the fluid-vectoring system 14 with bypass flows is in an air-braking right-turn arrangement, the first bypass flow 43 of environmental fluid is ingested through the first bypass cavity 42 formed in the first bypass passageway 41 and into the first fluid cavity 28 and the first bypass flow 43 of environmental fluid is blocked from moving downstream along the axis 11 through the first fluid passageway 16. When the fluid-vectoring system 14 with bypass flows is in an air-braking right-turn arrangement, the second bypass flow 48 of environmental fluid moves downstream along the axis 11 through the second bypass passageway 46 from an environment 13 surrounding the aircraft and through the second fluid cavity 38 formed in the second fluid passageway 18. The air-braking right-turn flight-arrangement causes the jet aircraft 10 to turn away from a forward direction in a right-turn direction.

The first fluid control unit 20 and the second fluid control unit 30 are both arranged in an in-flight braking configuration to establish the in-flight braking arrangement of the fluid-vectoring system 14 with bypass flows as shown in FIG. 8. When the fluid-vectoring system 14 with bypass flows is in an in-flight braking arrangement, air ingested through the first bypass flow 43 is communicated in the reverse direction of the first flow 27 and air ingested through the second bypass flow 48 is communicated in the reverse direction of the second flow 37. The combined effect results in airflow opposite the direction of travel, causing a reaction force that more rapidly decelerates the jet aircraft 10 to a relatively smaller velocity than a fluid-vectoring system 14 without bypass flows. The in-flight braking arrangement causes the jet aircraft 10 to decelerate to a relatively smaller second velocity.

In another embodiment, a single intake bypass flow could be split into first bypass flow 43 and second bypass flow 48. After the split, the bypass flows functions substantially the same as if two intake bypasses are provided.

The fluid-vectoring system 14 effects a maximum left yaw turn when the first fluid control unit 20 has a fully retracted configuration and the second fluid control unit 30 has a fully engaged configuration as shown in FIG. 6. A lower left yaw vector is effected when the second fluid control unit 30 has a less than fully engaged configuration. The second fluid control unit 30 has a less than fully engaged configuration when the first control door 32, the second control door 34, and the third control door 36 all have a partly-closed position instead of a fully-closed position.

The fluid-vectoring system 14 effects a maximum right yaw turn when the first fluid control unit 20 has a fully-engaged configuration and the second fluid control unit 30 has a fully-retracted configuration as shown in FIG. 7. A lower right yaw vector is effected when the first fluid control unit 20 has a less than fully-engaged configuration. The first fluid control unit 20 has a less than fully-engaged configuration when the first control door 22, the second control door 24, and the third control door 26 all have a partly-closed position instead of a fully-closed position.

In accordance with the present disclosure, the fluid-vectoring system 14 further includes first nozzle divergent sidewall 50A. The first nozzle divergent sidewall 50A separates a first aft fluid cavity 52 and an aft nozzle fluid cavity 72. The first aft fluid cavity 52 is formed in the first fluid passageway 16 to the aft of the first control door 22 in a closed position. The aft nozzle fluid cavity 72 is formed to the aft of a jet engine 15 in the body 12 of the jet aircraft 10.

In accordance with the present disclosure, the first nozzle divergent sidewall 50A includes a first plurality of hinged reed valves 54 coupled to the body 12 to move between an opened position that communicates a first vector flow between the aft nozzle fluid cavity 72 and the first aft fluid cavity 52 and a closed position that blocks the communication. In a vectored mode, the fluid-vectoring system 14 selectively moves the first plurality of hinged reed valves 54 between an opened position and a closed position. In a non-vectored mode, the first plurality of hinged reed valves remain closed. In another embodiment, the first nozzle divergent sidewall 50A is a porous sidewall with a first plurality of pores that communicate a first vector flow between the aft nozzle fluid cavity 72 and the first aft fluid cavity 52. The aero-mechanical design of the reed valves and interconnecting 2-D C-D nozzle flow path, would be based on, and optimized by, Computational Fluid Dynamics (CFD) analysis to verify that the reed valve venting improves yaw-vectoring without adverse nozzle performance penalties. In some embodiments, the reed valve vertical configuration disclosed may be eliminated depending on the application.

The jet aircraft 10 includes the fluid-vectoring system 14 in a vectored mode that selectively opens the first plurality of hinged reed valves 54. When the fluid-vectoring system 14 is in a forward-flight arrangement as shown in FIG. 5, an in-flight left-turn arrangement as shown in FIG. 6, or an in-flight braking arrangement as shown in FIG. 8, the first plurality of hinged reed valves 54 are in a closed position. When the fluid-vectoring system 14 is in an in-flight right-turn flight arrangement as shown in FIG. 7, the first plurality of hinged reed valves 54 are in an opened position. When the fluid-vectoring system 14 is in an in-flight right-turn flight arrangement, there is a sub-ambient pressure of environmental fluid in the first aft fluid cavity 52. A pressure differential between the aft nozzle fluid cavity 72 and the first aft fluid cavity 52 cause a first vector flow from the aft nozzle fluid cavity 72 through the first plurality of hinged reed valves, and into the first aft fluid cavity 52. The first vector flow causes the jet aircraft 10 to turn away from a forward direction in a right-turn direction with more force than a fluid-vectoring system 14 in a non-vectored mode in an in-flight right-turn arrangement.

In accordance with the present disclosure, the fluid-vectoring system 14 includes second nozzle divergent sidewall 50B. The second nozzle divergent sidewall 50B separates a second aft fluid cavity 62 and the aft nozzle fluid cavity 72. The second aft fluid cavity is formed in the second fluid passageway 18 to the aft of the first control door 32 in a closed position. In accordance with the present disclosure, the second nozzle divergent sidewall 50B includes a second plurality of hinged reed valves 64 coupled to the body 12 to move between an opened position that communicates a second vector flow between the aft nozzle fluid cavity 72 and the second aft fluid cavity 62 and a closed position that blocks the communication. In a vectored mode, the fluid-vectoring system 14 selectively moves the second plurality of hinged reed valves 64 between an opened position and a closed position. In a non-vectored mode, the second plurality of hinged reed valves remain closed. In another embodiment, the second nozzle divergent sidewall 50B is a porous sidewall with a second plurality of pores that communicate a second vector flow between the aft nozzle fluid cavity 72 and the second aft fluid cavity 62.

The jet aircraft 10 includes a fluid-vectoring system 14 in a vectored mode that selectively opens the second plurality of hinged reed valves 64. When the fluid-vectoring system 14 is in a forward-flight arrangement as shown in FIG. 5, an in-flight right-turn arrangement as shown in FIG. 7, or an in-flight braking arrangement as shown in FIG. 8, the second plurality of hinged reed valves 64 are in a closed position.

When the fluid-vectoring system 14 is in an in-flight left-turn arrangement as shown in FIG. 6, the second plurality of hinged reed valves 64 are in an opened position. When the fluid-vectoring system 14 is in an in-flight left-turn arrangement, there is a sub-ambient pressure of environmental fluid in the second aft fluid cavity 62. A pressure differential between the aft nozzle fluid cavity 72 and the second aft fluid cavity 62 cause the second vector flow from the aft nozzle fluid cavity 72 through the second plurality of hinged reed valves, and into the second aft fluid cavity 62. The second vector flow causes the jet aircraft 10 to turn away from a forward direction in a left-turn direction with more force than a fluid-vectoring system 14 in a non-vectored mode that is in an in-flight left-turn arrangement.

In another example, vector flows are developed when the first nozzle divergent sidewall and the second nozzle divergent sidewall are porous sidewalls as a result of pressure differentials forming between the first aft fluid cavity, the aft nozzle fluid cavity, and the second aft fluid. When the fluid-vectoring system is in an in-flight right-turn flight arrangement as suggested in FIG. 7, there is a sub-ambient pressure of environmental fluid in the first aft fluid cavity. A pressure differential between the aft nozzle fluid cavity and the first aft fluid cavity cause a first vector flow from the aft nozzle fluid cavity through the first nozzle divergent sidewall, and into the first aft fluid cavity. The first vector flow causes the jet aircraft to turn away from a forward direction in an in-flight right-turn direction with more force than a fluid-vectoring system without a porous first nozzle divergent sidewall.

When the fluid-vectoring system is in an in-flight left-turn arrangement as suggested in FIG. 6, there is a sub-ambient pressure of environmental fluid in the second aft fluid cavity. The pressure differential between the aft nozzle fluid cavity and the second aft fluid cavity cause the second vector flow from the aft nozzle fluid cavity through the second nozzle divergent sidewall, and into the second aft fluid cavity. The second vector flow causes the jet aircraft to turn away from a forward direction in a left-turn direction with more force than a fluid-vectoring system without a porous second nozzle divergent sidewall.

The amount of side force created for yaw vectoring, the resulting yaw moment created, and the amount of in-flight braking force created, is a function of the dimensions of the fluid-vectoring system, how the fluid-vectoring system is incorporated into the body of a craft, and the speed of the craft. Factors of the function include: the size of the first fluid passageway, the size of the second fluid passageway, the size of the control door 36, the area ratios of the passageway exits, the pressure ratios between the aft cavities, the location of the first fluid passageway relative to the center axis of the engine center-line, and the location of the second fluid passageway relative to the center axis of the engine center-line.

Figure 4:
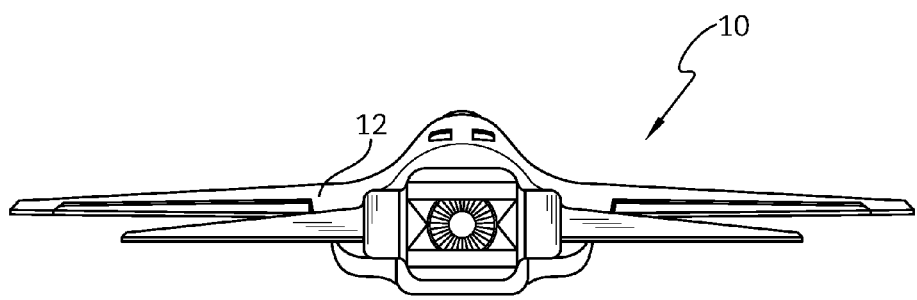
FIG. 4 is rear elevation view of the jet aircraft of FIGS. 1 and 3 showing a first rectangle-shaped vectoring-system exit aperture located on a right side of an outlet of the jet engine and a second rectangle-shaped vectoring-system exit aperture located on a left side of the outlet of the jet engine.

The rectangle-shaped vectoring-system exit apertures, shown for example in FIG. 4, may be changed to non-rectangular shapes to blend with the aircraft aft contours to reduce radar cross section and increase the thrust-minus-drag of the propulsion system integration. The rectangle-shaped vectoring-system apertures and nozzle exit aperture shown are illustrative only and not necessarily optimized for any given installation on an aircraft.

A two-engine jet aircraft may include a similar fluid-vectoring system. For a two-engine jet aircraft, a two-engine fluid-vectoring system would include a first fluid passageway and a second fluid passageway. In one example, both fluid passageways may be located inboard, e.g. between, the first engine and the second engine. In another example, both fluid passageways may be located outboard of a space defined between the first and second engines. Door assemblies may be circumferentially relocated for optimum aft-fuselage and tail integration.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
a body and
a fluid-vectoring system coupled to the body and configured to control movement of the body as the body moves along a flight path during flight of the aircraft, the fluid-vectoring system including a first fluid passageway arranged to extend along an axis of the body and to define a first fluid cavity therein, an environmental fluid passageway defining an environmental cavity and arranged to communicate a first flow of environmental fluid in a downstream direction from an environment surrounding the aircraft through the environmental cavity into the first fluid passageway, and a first fluid-control unit coupled to the body to move between a retracted configuration in which the first flow of environmental fluid moves downstream from the environment surrounding the aircraft through the environmental cavity, through the first fluid cavity, and to the environment and an engaged configuration in which the first fluid-control unit blocks the first flow of environmental fluid from flowing through the first fluid cavity,
wherein the first fluid-control unit includes a first control door coupled to the body to move between an opened position in which the first flow of environmental fluid is communicated through the first fluid cavity and a closed position in which the first control door extends into the first fluid cavity to block communication of the first flow of environmental fluid through the first fluid cavity,
wherein the body includes a first bypass passageway defining a first bypass cavity, the first bypass passageway is arranged to communicate a first bypass flow of environmental fluid in the downstream direction from the environment surrounding the aircraft through the first bypass cavity into the first fluid passageway, and
wherein the first control door is spaced apart in the downstream direction from an inlet of the environmental fluid passageway, spaced apart in the downstream direction from an inlet of the first bypass passageway, and spaced apart in the upstream direction from an outlet of the first fluid passageway.

2. The aircraft of claim 1, wherein the first fluid-control unit further includes a second control door coupled to the body to move between an opened position in which the first flow of environmental fluid is communicated into the first fluid cavity and a closed position in which the second control door extends into the first fluid cavity to block communication of the first flow of environmental fluid into the first fluid cavity.

3. The aircraft of claim 2, wherein the first fluid-control unit further includes a third control door coupled to the body to move between an opened position in which the first flow of environmental fluid is communicated past the first control door and into the first fluid cavity and a closed position in which the third control door forms an additional cavity in the first fluid cavity when the first control door in the closed position.

4. The aircraft of claim 3, wherein the first control door is movable relative to and independent of the second control door or the third control door.

5. The aircraft of claim 1, wherein the fluid-vectoring system further includes a second fluid passageway arranged to extend along the axis of the body and to define a second fluid cavity therein and a second fluid-control unit coupled to the body to move between a retracted configuration in which a second flow of environmental fluid moves downstream along the axis from the environment surrounding the aircraft, through the second fluid cavity, and to the environment and an engaged configuration in which the second fluid-control unit blocks the second flow of environmental fluid from flowing through the second fluid cavity.

6. The aircraft of claim 5, wherein the fluid-vectoring system is arranged in a forward-flight arrangement when the first fluid-control unit and the second fluid-control unit are in the retracted configurations which causes the aircraft to move at a first velocity in a forward direction.

7. The aircraft of claim 6, wherein the fluid-vectoring system is arranged in an in-flight left-turn arrangement when the first fluid-control unit is in the retracted configuration and the second fluid-control unit is in the engaged configuration which causes the aircraft to turn away from the forward direction in a left-turn direction.

8. The aircraft of claim 7, wherein the fluid-vectoring system is arranged in an in-flight right-turn arrangement when the first fluid-control unit is in the engaged configuration and the second fluid-control unit is in the retracted configuration which causes the aircraft to turn away from the forward direction in a right-turn direction.

9. The aircraft of claim 8, wherein the fluid-vectoring system is arranged in an in-flight braking arrangement when the first fluid-control unit and the second fluid-control unit are in an in-flight braking configuration when the first and second flows of environmental fluid are blocked from flowing downstream through the first and second fluid cavities to cause the aircraft to decelerate to a relatively smaller second velocity.

10. The aircraft of claim 5, wherein the first fluid-control unit includes a first control door coupled to the body to move between an opened position in which the first flow of environmental fluid is communicated through the first fluid cavity and a closed position in which the first control door extends into the first fluid cavity to block communication of the first flow of environmental fluid through the first fluid cavity, a second control door coupled to the body to move between an opened position in which the first flow of environmental fluid is communicated into the first fluid cavity and a closed position in which the second control door extends into the first fluid cavity to block communication of the first flow of environmental fluid into the first fluid cavity, and, a third control door coupled to the body to move between an opened position in which the first flow of environmental fluid is communicated past the first control door and into the first fluid cavity and a closed position in which the third control door forms an additional cavity in the first fluid cavity when the first control door is in the closed position.

11. The aircraft of claim 10, wherein the second fluid-control unit includes a first control door coupled to the body to move between an opened position in which the second flow of environmental fluid is communicated through the second fluid cavity and a closed position in which the first control door of the second fluid-control unit extends into the second fluid cavity to block communication of the second flow of environmental fluid through the second fluid cavity, a second control door coupled to the body to move between an opened position in which the second flow of environmental fluid is communicated into the second fluid cavity and a closed position in which the second control door of the second fluid-control unit extends into the second fluid cavity to block communication of the second flow of environmental fluid into the second fluid cavity, and, a third control door coupled to the body to move between an opened position in which the second flow of environmental fluid is communicated past the first control door of the second fluid-control unit and into the second fluid cavity and a closed position in which the third control door of the second fluid-control unit forms an additional cavity in the second fluid cavity when the first control door of the second fluid-control unit is in the closed position.

12. The aircraft of claim 11, wherein the fluid-vectoring system is in a forward-flight arrangement when all of the control doors are in the opened position.

13. The aircraft of claim 12, wherein the fluid-vectoring system is in an in-flight left-turn arrangement when all of the control doors of the first fluid-control unit are in the opened position and all of the control doors of the second fluid-control unit are in the closed position.

14. The aircraft of claim 13, wherein the fluid-vectoring system is in an in-flight right-turn arrangement when all control doors of the first fluid-control unit are in the closed position and all the control doors of the second fluid-control unit are in the opened position.

15. The aircraft of claim 14, wherein the fluid-vectoring system is in an in-flight braking arrangement when the first control doors of both the first and second fluid-control units are in the closed position and the second and third control doors of both the first and second fluid-control units are in the opened position.

16. The aircraft of claim 1, wherein the fluid-vectoring system further includes a second fluid passageway arranged to extend along the axis of the body and to define a second fluid cavity therein and a second fluid-control unit coupled to the body to move between a retracted configuration in which a second flow of environmental fluid moves downstream along the axis from the environment surrounding the aircraft, through the second fluid cavity, and to the environment and an engaged configuration in which the second fluid-control unit blocks the second flow of environmental fluid from flowing through the second fluid cavity.

17. The aircraft of any preceding claim, wherein the body lacks a vertical stabilizer.

18. A method of controlling movement of an aircraft, the method comprising the steps of providing a craft including a fluid-vectoring system comprising a first fluid passageway controlled by a first fluid-control unit and a second fluid passageway controlled by a second fluid-control unit and lacking a vertical stabilizer, the fluid-vectoring system further comprising a first environmental fluid passageway connected to the first fluid passageway, a first bypass passageway connected to the first fluid passageway, a second environmental fluid passageway connected to the second fluid passageway, and a second bypass passageway connected to the second fluid passageway, the first fluid-control unit including a first control door being spaced apart from an inlet of the first environmental fluid passageway, spaced apart from an inlet of the first bypass passageway, and spaced apart from an outlet of the first fluid passageway, and the second fluid-control unit including a second control door being spaced apart from an inlet of the second environmental fluid passageway, spaced apart from an inlet of the second bypass passageway, and spaced apart from an outlet of the second fluid passageway, arranging the fluid-vectoring system in a forward-flight arrangement to cause a flow of environmental fluid to communicate through the first fluid passageway and a flow of environmental fluid to communicate through the second fluid passageway, arranging the fluid-vectoring system in an in-flight left-turn arrangement to cause a left yaw turn by allowing a flow of environmental fluid to communicate through the first fluid passageway and by blocking a flow of environmental fluid from communicating through the second fluid passageway, arranging the fluid-vectoring system in a right-turn arrangement to cause a right yaw turn by blocking a flow of environmental fluid from communicating through the first fluid passageway and by allowing a flow of environmental fluid to communicate through the second fluid passageway, and arranging the fluid-vectoring system in an in-flight braking arrangement by preventing a flow of environmental fluid through the first fluid passage way and by preventing a flow of environmental fluid through the second fluid passage way.

* * * * *